(12) United States Patent
Imai et al.

(10) Patent No.: US 9,172,202 B2
(45) Date of Patent: Oct. 27, 2015

(54) LASER APPARATUS AND LASER MATERIALS PROCESSING APPARATUS PROVIDED WITH SAME

(75) Inventors: Hirofumi Imai, Tokyo (JP); Koji Hirano, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 37 days.

(21) Appl. No.: 13/879,528

(22) PCT Filed: Oct. 18, 2010

(86) PCT No.: PCT/JP2010/068270
§ 371 (c)(1),
(2), (4) Date: Apr. 15, 2013

(87) PCT Pub. No.: WO2012/053045
PCT Pub. Date: Apr. 26, 2012

(65) Prior Publication Data
US 2013/0215914 A1 Aug. 22, 2013

(51) Int. Cl.
H01S 3/30 (2006.01)
H01S 3/067 (2006.01)
B23K 26/06 (2014.01)
H01S 3/094 (2006.01)
H01S 3/00 (2006.01)
(Continued)

(52) U.S. Cl.
CPC ......... *H01S 3/06716* (2013.01); *B23K 26/0613* (2013.01); *H01S 3/005* (2013.01); *H01S 3/0675* (2013.01); *H01S 3/09408* (2013.01); *H01S 3/094011* (2013.01); *H01S 3/175* (2013.01); *H01S 3/23* (2013.01)

(58) Field of Classification Search
CPC ............ B23K 26/0613; H01S 3/06716; H01S 3/0675; H01S 3/094011; G02B 6/28

USPC .............................. 372/6; 359/341.3; 385/28
See application file for complete search history.

(56) References Cited

U.S. PATENT DOCUMENTS 6,275,250 B1 * 8/2001 Sanders et al. ................ 347/247
6,477,295 B1 11/2002 Lang et al.
(Continued)

FOREIGN PATENT DOCUMENTS

CN 101212115 A 7/2008
CN 101340053 A 1/2009
(Continued)

OTHER PUBLICATIONS

Hilton, "Cutting Stainless Steel with Disc and CO2 Lasers," Proceedings of LAMP2009—the 5th International Congress on Laser Advanced Materials Processing, 2009, pp. 1-6.
(Continued)

*Primary Examiner* — Tuan Nguyen
(74) *Attorney, Agent, or Firm* — Birch, Stewart, Kolasch & Birch, LLP

(57) ABSTRACT

A laser apparatus of the present invention has a first laser oscillator that emits a first laser beam; a passive fiber that is a double-clad fiber that transmits the first laser beam through a core; and a second laser oscillator that emits a second laser beam that is coupled into inner cladding of the passive fiber. Additionally, a laser materials processing apparatus of the present invention is provided with the laser apparatus; and an irradiation optical system having a collimating lens and a condenser lens.

10 Claims, 12 Drawing Sheets

(51) Int. Cl.
*H01S 3/17* (2006.01)
*H01S 3/23* (2006.01)

(56) References Cited

U.S. PATENT DOCUMENTS

| | | | |
|---|---|---|---|
| 6,529,318 | B1 | 3/2003 | Kaneda et al. |
| 7,436,863 | B2 * | 10/2008 | Matsuda et al. .................. 372/6 |
| 7,768,700 | B1 * | 8/2010 | Savage-Leuchs .......... 359/341.1 |
| 2003/0197921 | A1 | 10/2003 | Jiang et al. |
| 2007/0086693 | A1 * | 4/2007 | Murphy et al. ................. 385/12 |
| 2008/0107384 | A1 | 5/2008 | Nadolski |
| 2008/0123694 | A1 * | 5/2008 | Nakamae et al. .................. 372/6 |

FOREIGN PATENT DOCUMENTS

| | | |
|---|---|---|
| CN | 101615761 A | 12/2009 |
| JP | 58-159514 A | 9/1983 |
| JP | 5-275792 A | 10/1993 |
| JP | 2004-154813 A | 6/2004 |
| JP | 2004-337881 A | 12/2004 |
| JP | 2005-84386 A | 3/2005 |
| JP | 2007-335522 A | 12/2007 |

OTHER PUBLICATIONS

International Search Report issued in PCT/JP2010/068270, mailed on Nov. 9, 2010.

Japanese Office Action issued in JP 2012-539486, mailed on Feb. 26, 2013.

Extended European Search Report issued in EP 10 85 8601.7, mailed on Apr. 9, 2014.

Chinese Office Action for Application No. 201080069641.2, dated Jan. 28, 2015.

* cited by examiner

LASER APPARATUS AND LASER MATERIALS PROCESSING APPARATUS PROVIDED WITH SAME

TECHNICAL FIELD

The present invention relates to a laser apparatus to be used when a metallic material or the like is processed, and a laser materials processing apparatus provided with this laser apparatus.

BACKGROUND ART

In recent years, in a field of materials processing with high-power lasers, attention is paid to processing by a laser apparatus using an optical fiber to which rare earth elements are doped. The laser emits a wavelength of 1 μm band, and an optical-fiber delivery is possible unlike $CO_2$ laser used in the related art. Additionally, since this laser can be focused to a smaller spot than $CO_2$ laser, it is suitable for high-speed processing or fine micro processing, such as cutting, welding, or the like. Regarding this laser apparatus, there are already a number of well-known techniques (for example, refer to Patent Document 1).

An example of a laser materials processing apparatus 100 of the related art is schematically shown in FIG. 13. The laser materials processing apparatus 100 is generally constituted by a laser apparatus 101, an optical fiber 122, and an irradiation optical system (a collimating lens 105 and a condenser lens 106). A laser beam 104, which is generated in the laser apparatus 101, is guided and transmitted through the optical fiber 122, and exits the emitting end 103, passes through the collimating lens 105 and the condenser lens 106, and reaches an irradiation point α on a workpiece 107.

A related-art example of the above laser apparatus 101 is shown in FIG. 14. The laser apparatus 101 is generally constituted by an active fiber 120 that is a double-clad fiber in which rare earth elements are doped to a parent material of a core, fiber Bragg gratings (hereinafter abbreviated as FBGs) 121 that are formed near both ends of this active fiber 120 to act as mirrors of laser resonators, a multi-coupler 123, a plurality of semiconductor laser beam sources 126, and an optical fiber 122 that is connected to the active fiber 120 via a connecting point 129.

The double-clad fiber is an optical fiber having double claddings around a core. In the related art, the double-clad fiber is used as a laser medium by doping rare earth elements or the like to the parent material of the core. Inner cladding has two kinds of actions. One action confines the light within the core. The other action confines pumping light that pumps the laser medium within the core. Outer cladding has an action that confines the pumping light.

The pumping light emitted from the plurality of semiconductor laser beam sources 126 is coupled into the inner cladding of the active fiber 120 via the optical fiber 125 and the multi-coupler 123. The laser beam generated in the core of the active fiber 120 is amplified while going back and forth between both the FBGs 121, and a portion thereof is taken out from one FBG 121 (FBG 121 on the right of the plane of the sheet). This laser beam is coupled into the optical fiber 122 located downstream of the connecting point 129, and is emitted to exterior space from an output end 103. In addition, a passive optical fiber for transmission with single-layer cladding is used as the optical fiber 122 located downstream of the connecting point 129. As described above, the laser apparatus of the configuration using an active fiber as the laser medium is referred to as a fiber laser.

The power density distribution at a cross-section of the optical fiber 122 may be a single mode close to a Gaussian shape or a multi-mode close to a top-hat shape.

A laser beam of an output of 2 kW or more is used for macro processing referred to as cutting of steel of a thickness of 1 mm or more. The single mode output in these region causes, the large optical loss due to nonlinear effects such as stimulated Brillouin scattering or Raman scattering within the core of the optical fiber. Therefore, the distance by which fiber transmission is allowed is limited to about several meters. Thus, in the laser materials processing apparatus, generally, a fiber laser of a multi-mode where a larger fiber transmission distance is secured is used.

The power density distribution of the laser beam at the irradiation point α is an image of the outlet (the emitting end 103 of the laser apparatus 101) of the optical fiber 122, formed by an irradiation optical system including the collimating lens 105 and the condenser lens 106. In the case of the fiber laser where the power density distribution in the optical fiber 122 being multi-mode, the power density distribution at the irradiation point α becomes a substantially uniform top-hat shape, as shown in FIG. 15, which is uniform and almost the same distribution within the optical fiber 122. In addition, in FIG. 15, X represents the distance from the center O of a laser beam at the irradiation point α, and I represents the power density of the laser beam.

CITATION LIST

Patent Literature

[Patent Document 1] Japanese Unexamined Patent Application, First Publication No. H05-275792

Non-Patent Literature

[Non-Patent Document 1] P. Hilton, Proceedings of LAMP2009—the 5th International Congress on Laser Advanced Materials Processing, 2009

SUMMARY OF INVENTION

Technical Problem

However, in processing of metals using the laser apparatus of the related art having the multi-mode optical fiber, processing could not be performed with expected quality compared with the processing by $CO_2$ lasers, due to the reasons such that the roughness of a cut section surface deteriorates in cutting or grooving, the amount of spattering matter from the workpiece increases in welding or in cladding (for example, refer to NPL 1). This problem becomes marked, particularly in a case where a workpiece is thick or when the cutting speed is low.

The present invention has been made in view of the above situation, and an object thereof is to provide a laser apparatus that can improve the roughness of a processed surface and can reduce the amount of spattering matter from a workpiece, and a laser materials processing apparatus provided with the laser apparatus, in laser materials processing that processes a metal or the like using a high-power laser beam transmitted by an optical fiber.

Solution to Problem

As a result of the present inventors' keen examination, the inventors have found out that the quality of a processed surface can be improved and the quantity of spattering matter from a workpiece can be reduced, by adding a skirt to the power density distribution in a cross-section orthogonal to the propagation direction of a laser beam, and have developed a laser apparatus and a laser materials processing apparatus suitable for realizing this.

(a) A laser apparatus related to an aspect of the present invention has a first laser oscillator that emits a first laser beam; a passive fiber that is a double-clad fiber that transmits the first laser beam through a core; and a second laser oscillator that emits a second laser beam that is coupled into inner cladding of the passive fiber.

(b) In the laser apparatus described in the above (a), a configuration may be adopted in which the first laser oscillator has a laser resonator having an active fiber that is a double-clad fiber in which rare earth elements are doped to a core, and pumping light sources that emit pumping light that are coupled into inner cladding of the active fiber, and wherein the passive fiber is connected to the downstream side of the active fiber.

(c) In the laser apparatus described in the above (a), the incident angle $\theta_{FL}$ of the first laser beam that is coupled into the core of the passive fiber may be smaller than the incident angle $\theta_{LD}$ of the second laser beam that is coupled into the inner cladding of the passive fiber.

(d) In the laser apparatus related to the above (a), the wavelength $\lambda 1$ of the first laser beam and the wavelength $\lambda 2$ of the second laser beam satisfy $0.6 \leq \lambda 2/\lambda 1 \leq 0.97$.

(e) A laser materials processing apparatus related to an aspect of the present invention condenses a laser beam and irradiates a workpiece with a laser beam, and includes the laser apparatus according to any one of the above (a) to (d); and an irradiation optical system having a collimating lens and a condenser lens.

(f) In the laser materials processing apparatus described in the above (e), the power density $I_b$ of the second laser beam may be smaller than the power density $I_a$ of the first laser beam.

(g) In the case of the laser materials processing apparatus described in the above (f), the power density $I_b$ of the second laser beam may satisfy the following Formula (1).

$$I_b \cdot (D2-D1)/2 > 0.2 \cdot (1/A) \cdot \kappa \cdot \{\rho C_p (T_m - T_0) + \rho L_m\} \quad (1)$$

Here,

D1: Spot diameter of the first laser beam,
D2: Spot diameter of the second laser beam,
A: Absorption factor of the second laser beam to the workpiece,
κ: Thermal diffusion coefficient of the workpiece,
ρ: Density of the workpiece,
$C_p$: Specific heat of the workpiece,
$T_m$: Melting point of the workpiece,
$T_0$: Initial temperature of the workpiece (room temperature), and
$L_m$: Latent heat of fusion of the workpiece Advantageous Effects of Invention In the laser apparatus described in the above (a), the first laser beam is emitted from the core of the passive fiber, and the second laser beam is emitted from the inner cladding of the passive fiber. When processing is performed while a laser beam is moved, an overlapping component between the second laser beam and the first laser beam is irradiated to a part to be processed after the second laser beam is irradiated to the part to be processed.

That is, processing of the workpiece is performed by a laser beam with sufficient energy for processing after a member to be processed is preheated by the second laser beam. In this case, although the energy absorption of the laser beam occurs in the preheated location, in the laser apparatus described in the above (a), the power density of the second laser beam is made smaller than the power density of the overlapping component between the first laser beam and the second laser beam. For this reason, this energy absorption does not occur excessively. As a result, even if the processing speed is low or the workpiece is thick, the quality of a processed surface is improved and the amount of spattering matter can be reduced.

Additionally, in the laser materials processing apparatus described in the above (e), the second laser beam having energy suitable for preheating the workpiece, and the overlapping component between the second laser beam and the first laser beam, which has sufficient energy to process the workpiece, are coaxially emitted. Since these laser beams are emitted from different light sources, the energy of these laser beams can be easily and mutually independently set to values suitable for respective processing. As a result, even if the processing speed is low or the workpiece is thick, the roughness of a processed surface becomes small and the amount of spattering can be reduced. Therefore, the quality of the part to be processed can be improved.

DESCRIPTION OF EMBODIMENTS

Figure 1:
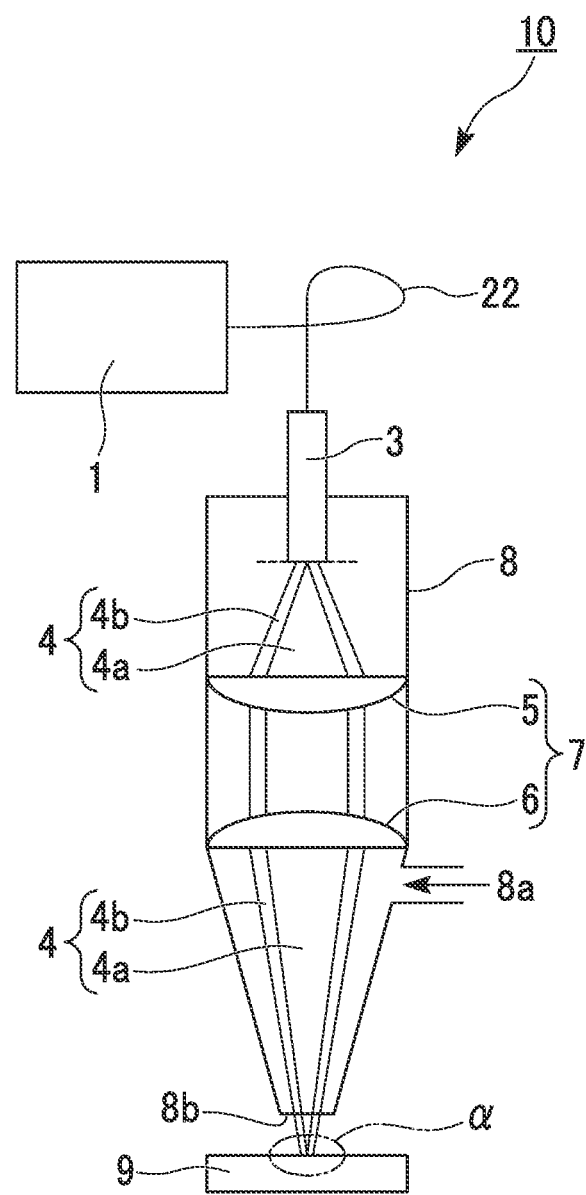
FIG. 1 is a view schematically showing a laser processing apparatus related to one embodiment of the present invention.

FIG. 1 is a view schematically showing a laser materials processing apparatus 10 related to one embodiment of the present invention. The laser materials processing apparatus 10 of the present embodiment is generally constituted by a laser apparatus 1, an irradiation optical system 7, and a housing 8. The irradiation optical system 7 is constituted by, for example, a collimating lens 5 and a condenser lens 6. The collimating lens 5 and the condenser lens 6 are arranged within the housing 8 so as to be movable up and down independently from each other. An output end 3 (an output end 3 of a passive fiber 22) of the laser apparatus 1 is connected to the housing 8. Laser beams 4 (4a, 4b) emitted from the output end 3 of the passive fiber 22 are turned into parallel light in the collimating lens 5, are condensed with a suitable size by the condenser lens 6, and are irradiated to a workpiece 9.

The laser materials processing apparatus 10 of the present embodiment is used, for example, when cutting, grooving, welding, or cladding of metals or the like is performed. When the cutting or grooving of metal is performed, the cutting or grooving is performed while oxygen gas or nitrogen gas is introduced as an assist gas from a gas inlet 8a formed in the housing 8. The assist gas introduced into the housing 8 is jetted from a tip opening 8b of the housing 8 to remove molten metal from a cutting curf. When the welding or cladding of metal is performed, the welding or cladding is performed while inert gas, such as nitrogen gas or argon gas, is introduced into the housing 8 from the gas inlet 8a, and this inert gas is jetted from the tip opening 8b of the housing 8. In addition, the opening may have a coaxial multi-structure and a plurality of corresponding gas inlets may be provided.

Figure 2:
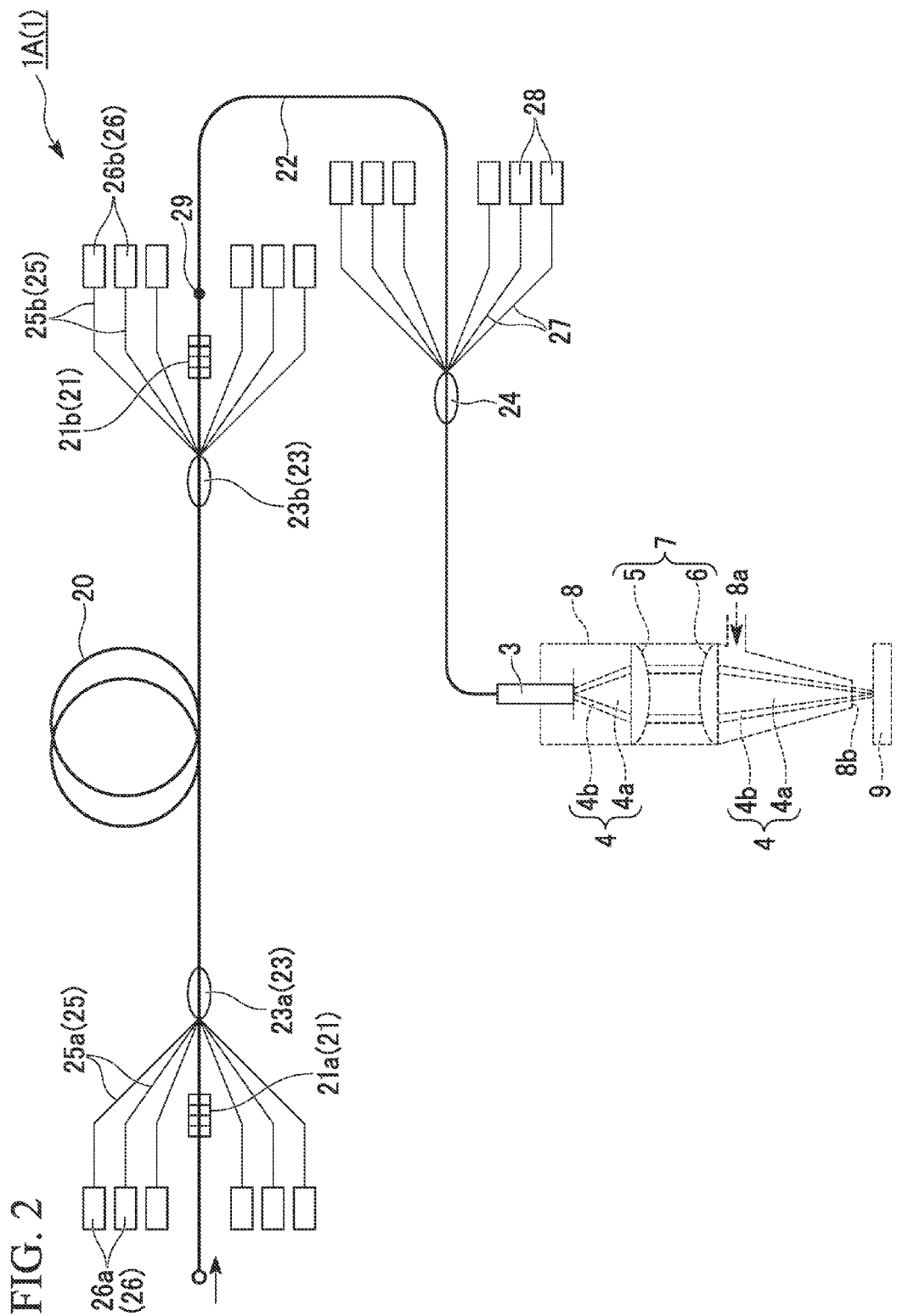
FIG. 2 is a view schematically showing the laser apparatus related to the embodiment.

FIG. 2 is a view schematically showing the laser apparatus 1. A laser apparatus 1A(1) of the present embodiment is used as a laser oscillator of the laser materials processing apparatus 10.

The laser apparatus 1A is generally constituted by a first laser oscillator, a passive fiber 22 that is a double-clad fiber that transmits a first laser beam emitted from the first laser oscillator through a core, and a second laser oscillator that emits a laser beam coupled into the inner cladding of the passive fiber 22. The first laser oscillator is generally constituted by an active fiber 20 that performs laser operation and is a double-clad fiber, fiber Bragg gratings (FBGs) 21 (21a, 21b) that are formed in the vicinity of both ends of the active fiber 20, first multi-couplers 23 (23a, 23b) that are arranged inside the respective FBGs 21, a plurality of pumping light sources 26 (26a, 26b), and first optical fibers 25 (25a, 25b) that optically connects the first multi-couplers 23 (23a, 23b) and the pumping light sources 26 (26a, 26b). The passive fiber 22 that transmits the first laser beam is connected to the active fiber 20 via a connecting point 29. The second laser oscillator includes a plurality of semiconductor laser beam sources 28. A second multi-coupler 24 is arranged on the passive fiber 22, and the second multi-coupler 24 and the respective semiconductor laser beam sources 28 are optically connected by a plurality of second optical fibers 27. In addition, the active fiber 20 formed with the FBGs 21 (21a, 21b) acts as a laser resonator. That is, the FBG 21a is a total reflection mirror and the FBG 21b is a partial reflection mirror. Additionally, the cores of the active fiber 20 and the passive fiber 22 are connected by fusion or the like at the connecting point 29.

Figure 3:
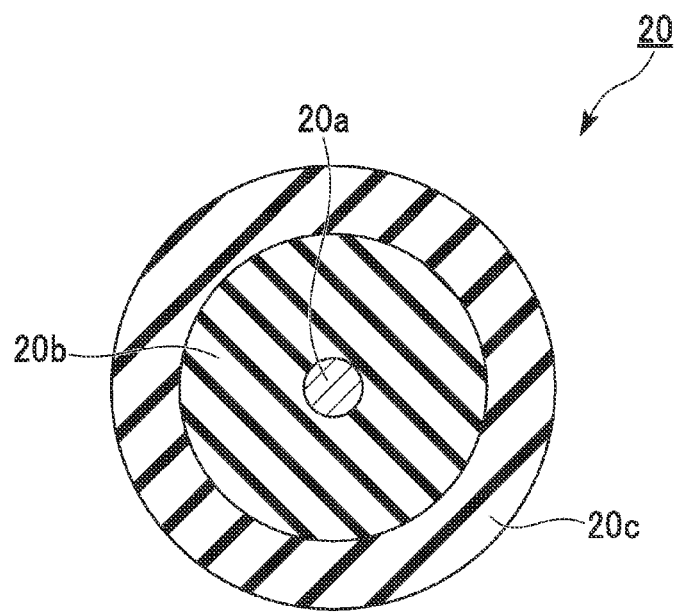
FIG. 3 is a view schematically showing the cross-section of a double-clad fiber (active fiber) used for the laser apparatus of the embodiment.

FIG. 3 is a view schematically showing the cross-section of the active fiber 20 used for the laser apparatus 1A of the present embodiment. The active fiber 20 is constituted by a core 20a, inner cladding 20b provided around the core 20a, and outer cladding 20c provided around the inner cladding 20b.

The core 20a is made of, for example, quartz as a base material, and rare earth elements, such as ytterbium (Yb) or erbium (Er), are doped to quartz. Additionally, a dopant that enhances the refractive index of germanium (Ge), phosphorus (P), or the like may be added. The core 20a becomes a laser medium. The FBGs 21 (21a, 21b) are formed in the core 20a in the vicinity of both ends of the active fiber 20.

The inner cladding 20b has a refractive index lower than the core 20a, and is formed from, for example, quartz to which fluorine (F) or boron (B) is added. In a case where Ge or P is added to the core 20a, the inner cladding may be formed only from quartz. Pumping light emitted from the pumping light sources 26 (26a, 26b) enters the inner cladding 20b via the first optical fiber 25 (25a, 25b) and the first multi-coupler 23 (23a, 23b), respectively, and performs optical pumping of the rare earth element of the core 20a. In the core 20a where the optical pumping is performed, laser oscillation is generated, and a first laser beam (fiber laser beam) that is the output of the laser oscillation is introduced into the core of a downstream passive fiber 22 through the FBG 21b that is a partial reflection mirror. The cross-sectional shape of the inner cladding 20b, as shown in FIG. 3, may be a circular shape or may be a polygonal shape or a D-shape as long as the laser oscillation is allowed.

The outer cladding 20c has a refractive index lower than the inner cladding 20b, and acts as cladding for the pumping light that is guided by the core 20a and the inner cladding 20b. The outer cladding 20c is formed from, for example, resin. Alternatively, the outer cladding may be made of quartz to which F, B, or the like is added.

FIG. 2 will be referred to again. Semiconductor lasers are suitable as the pumping light sources 26 (26a, 26b). The number or output of the pumping light sources is not particularly limited and is appropriately set according to the output of a fiber laser beam required. The wavelength of the pumping light emitted from the respective pumping light sources 26 (26a, 26b) is matched with the absorption wavelength of the rare earth elements doped to the core 20a. The pumping light sources 26 constituted by semiconductor lasers are also referred to as first semiconductor laser beam sources 26.

The first optical fibers 25 (25a, 25b) are not particularly limited if the pumping light can be guided, and ordinary single-clad fibers with single-layer cladding can be used as the first optical fibers.

The passive fiber 22 has a double-clad structure including a core 22a, inner clad 22b provided around the core 22a, and outer clad 22c provided around the inner clad 22b, similarly to the active fiber 20. However, the passive fiber is different from the active fiber 20 in that the rare earth elements are not doped to the core 22a of the passive fiber 22 and the FBGs are not formed. Additionally, the cross-sectional shape of the inner cladding 22b is preferably a circular shape.

A fiber laser beam emitted from a core end face of the active fiber 20 is introduced into the core 22a of the passive fiber 22.

Semiconductor laser beams (second laser beams) emitted from the semiconductor laser beam sources (also referred to as second semiconductor laser beam sources) 28 are coupled into the inner cladding 22b of the passive fiber 22 via the second optical fibers 27 and the second multi-coupler 24.

That is, the two laser beams (the fiber laser beam 4a and the semiconductor laser beam 4b) are coupled to the passive fiber 22 and thereby coaxialized. For this reason, the coaxialization of the laser beams 4 (4a, 4b) can be performed simply rather than in a case where the two laser beams 4 (4a, 4b) are coaxialized using a mirror or the like and are stable against surrounding environmental changes (temperature change or the like), vibration, or the like. Then, the fiber laser beam 4a and the semiconductor laser beam 4b that are coaxialized are emitted from the passive fiber 22, that is, the emitting end 3 of the laser apparatus 1A. These laser beams are irradiated to an irradiation point α via the irradiation optical system 7 including the collimating lens 5, the condenser lens 6, and the like.

The core diameter of the passive fiber 22 is preferably equal to or larger than that of the active fiber 20. The refractive indexes of the inner clad 22b and the outer clad 22c of the passive fiber 22 may be the same as or different from the refractive index of the active fiber 20. The refractive indexes of the inner clad 22b and the outer clad 22c can be appropriately set depending on the wavelength of the semiconductor laser beam that is coupled into the inner clad 22b of the passive fiber 22.

The number or output of the second semiconductor laser beam sources 28 is not particularly limited, and is appropriately set according to the output of the semiconductor laser beam 4b required. The wavelength of the semiconductor laser beams emitted from the second semiconductor laser beam sources 28 may be the same as or different from that of the pumping light sources 26 (26a, 26b) (first semiconductor laser beam sources).

The second optical fibers 27 are not particularly limited if the semiconductor laser beams can be guided, and ordinary single-clad fibers with single-layer cladding can be used as the second optical fibers.

Figure 4:
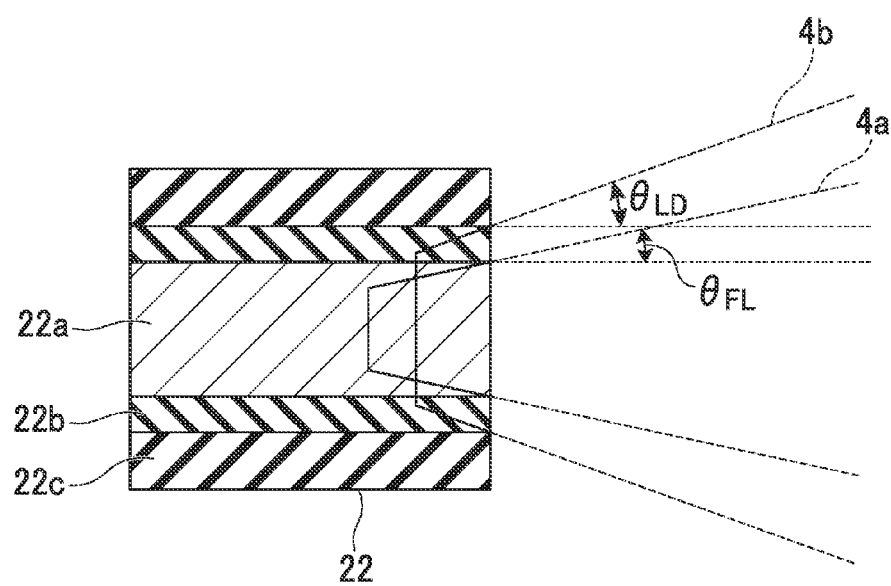
FIG. 4 is a cross-sectional view schematically showing a situation in which a laser beam and a semiconductor laser beam are coupled into the core and inner cladding of a double-clad fiber (passive fiber), respectively.

FIG. 4 is a view schematically showing the situation that the fiber laser beam 4a and the semiconductor laser beam 4b are coupled into the passive fiber 22, and is a cross-sectional view of the passive fiber 22 cut in a plane including the axis of a fiber. In the present embodiment, it is preferable that $\theta_{FL} < \theta_{LD}$ be established regarding the incident angle $\theta_{FL}$ of the fiber laser beam 4a that is coupled into the core 22a and the incident angle $\theta_{LD}$ of the semiconductor laser beam 4b that is coupled into the inner clad 22b. As $\theta_{FL} < \theta_{LD}$ is established, the semiconductor laser beam 4b is automatically arranged outside the fiber laser beam 4a at a focusing point when being condensed by the same optical system.

In order to satisfy $\theta_{FL} < \theta_{LD}$, the refractive indexes of the core 22a and the inner clad 22b of the passive fiber 22 may be adjusted to suitable values. That is, $\theta_{FL} < \theta_{LD}$ is obtained by setting the relative index difference Δ between the core 22a and the inner clad 22b to Δ>0. Here, the relative index difference Δ is defined by Δ≡(n1−n2)/n1 when the refractive index of the core 22a is n1 and the refractive index of the inner clad 22b is n2.

Figure 5:
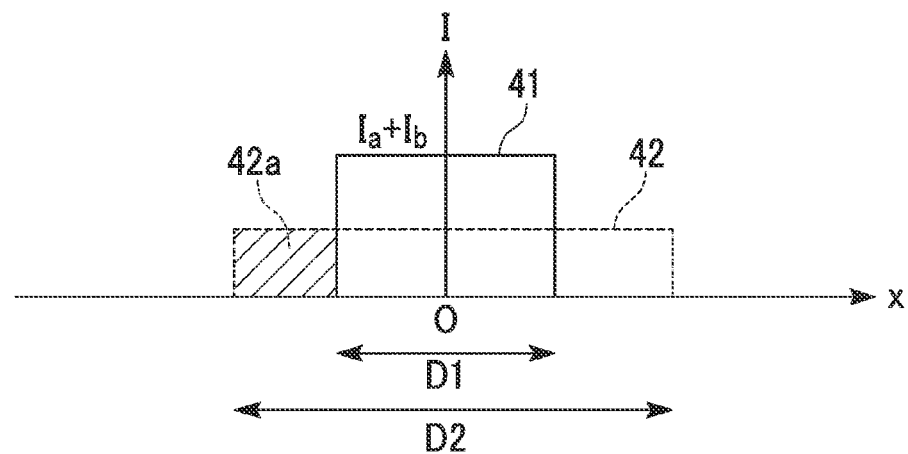
FIG. 5 is a view showing the power density distribution of a laser beam at an irradiation point α of the laser apparatus of the embodiment.

FIG. 5 is a view showing the power density distribution of the laser beams 4 (4a, 4b) at the irradiation point α (obtained by the laser apparatus 1A of the present embodiment), X represents the distance from the center O of the laser beams 4 at the irradiation point α and I represents the magnitude of the power density of the laser beams 4.

As described above, the fiber laser beam 4a emitted from the laser resonator (active fiber 20) and the semiconductor laser beam 4b emitted from the semiconductor laser beam sources 28 are irradiated to the irradiation point α. Therefore, as shown in FIG. 5, there are a first region 41 (a spot diameter D1) originating from the fiber laser beam 4a and a second region 42 (a spot diameter D2) originating from the semiconductor laser beam 4b also in the power density distribution of the laser beams 4. As for each of the two laser beams 4 (4a, 4b), the s power density distribution at the irradiation point α has a substantially uniform top-hat shape.

In the present embodiment, the power density $I_a$ of the fiber laser beam 4a and the power density $I_b$ of the semiconductor laser beam 4b are preferably $I_a > I_b$ and more preferably $I_a/10 \geq I_b$.

Here, the power density $I_a$ of the fiber laser beam 4a at the irradiation point α is obtained by dividing the output $P_a$(W) of the fiber laser beam 4a by spot area $S_a$ (mm²) because the distribution of this laser beam is uniform, that is, top-hat shaped. That is, the power density $I_a$ of the fiber laser beam 4a is obtained by the following Formula (2).

$$I_a = \frac{P_a}{S_a} \quad (2)$$

Similarly, the power density $I_b$ of the semiconductor laser beam 4b at the irradiation point α is obtained by dividing the power $P_b$ (W) of the semiconductor laser beam 4b by spot area $S_b$ (mm²). That is, the power density $I_b$ of the semiconductor laser beam 4b is obtained by the following Formula (3).

$$I_b = \frac{P_b}{S_b} \quad (3)$$

The spot diameter D1 of the fiber laser beam 4a and the spot diameter D2 of the semiconductor laser beam 4b at the irradiation point α are expressed by the following Formulas (4) and (5), respectively.

$$D1 = \left(\frac{fb}{fa}\right) \cdot d1 \quad (4)$$

$$D2 = \left(\frac{fb}{fa}\right) \cdot d2 \quad (5)$$

Here, d1 (mm) is the core diameter of the passive fiber 22 that transmits the fiber laser beam 4a, and d2 (mm) is the diameter of the inner cladding of the passive fiber 22 that transmits the semiconductor laser beam 4b. The above-identified "fa" is the focal length (mm) of the collimating lens 5, and the above-identified "fb" is the focal length (mm) of the condenser lens 6.

As described above, the fiber laser beam 4a propagates through only the core 22a of the passive fiber 22. Accordingly, the diameter of the fiber laser beam 4a at an outlet of the passive fiber 22 is given by the core diameter d1 of the passive fiber 22. On the other hand, the semiconductor laser beam 4b spreads and propagates also through the inner cladding 22b in addition to the core 22a of the passive fiber 22. Accordingly, the diameter of the semiconductor laser beam 4b at the outlet of the passive fiber 22 is given by the diameter d2 of the inner cladding 22b of the passive fiber 22. Here, since d1<d2 is established, the spot diameters of the laser beams 4a and 4b become D1<D2 (the semiconductor laser beam 4b becomes larger).

Since the laser beams 4 emitted from the laser apparatus 1A satisfy $I_a > I_b$ and D1<D2 from above, a form as shown in FIG. 5 is obtained in which a skirt formed by the semiconductor laser beam 4b is added to the periphery of an overlapping component between the fiber laser beam 4a and the semiconductor laser beam 4b. Accordingly, when the workpiece 9 is processed while the laser beam 4 is moved, the semiconductor laser beam 4b is irradiated to a part to be processed ahead of the overlapping component between the fiber laser beam 4a and the semiconductor laser beam 4b. Accordingly, processing is performed by the overlapping component between the fiber laser beam 4a and the semiconductor laser beam 4b after a part to be processed is sufficiently preheated by the semiconductor laser beam 4b. In this case, since $I_a > I_b$ and more preferably $I_a/10 \geq I_b$ is established as described above, the part to be processed is not excessively preheated. Therefore, deterioration of the roughness of a processed surface or the amount of scattered matter of the workpiece 9 can be reduced.

According to the laser apparatus 1A of the present embodiment, the two laser beams 4a and 4b are emitted from different light sources, respectively. Therefore, the power densities $I_a$ and $I_b$ of the respective laser beams 4a and 4b can be independently adjusted. Additionally, the spot diameters D1 and D2 of the respective laser beams 4a and 4b can be adjusted by changing the diameters of the cores 20a and 22a or the diameters of the inner cladding 20b and 22b in the active fiber 20 and the passive fiber 22. Accordingly, in the present embodiment, the two laser beams 4a and 4b can be easily optimized to configurations suitable for respective processing.

In the present embodiment, the central wavelength λ1 of the fiber laser beam 4a is preferably different from the central wavelength λ2 of the semiconductor laser beam 4b. That is, λ2/λ1 is preferably about 0.6 to 0.97. This can suppress the chromatic aberration between the fiber laser beam 4a and the semiconductor laser beam 4b at the irradiation point α. As a result, the workpiece 9 can be processed with stable power density.

Next, a case where the laser materials processing apparatus 10 of the present embodiment is used as a cutting apparatus will be described. In the case of laser cutting, as described above, an assist gas for removing melt from a cutting curf is used.

Figure 6:
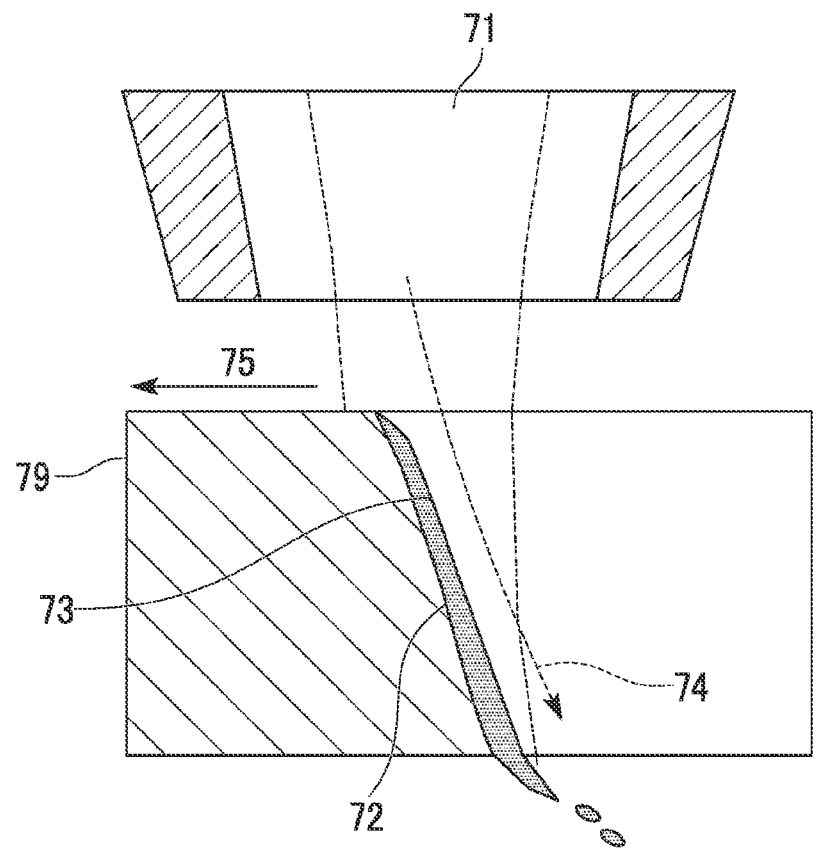
FIG. 6 is a cross-sectional view schematically showing the situation of laser cutting.

FIG. 6 is a view schematically illustrating a mechanism of the laser cutting, and showing a cross-section in a plane including a laser beam and cutting line. In addition, a case where only one-wavelength laser beam 71 is irradiated is shown.

Laser cutting is roughly divided into the processes that includes a heating and melting of a cutting front 72 by the laser beam 71, and a removal of a melting layer 73 by an assist gas flow 74. Although FIG. 6 shows the situation of a specific moment in time under cutting, and the cutting process progresses every moment to the left of FIG. 6 as shown by arrow 75.

In a case where the workpiece 79 is cut using the laser beam 71, cutting using the laser apparatus of the related art has a problem in that the roughness of a cutting surface deteriorates compared to a case where $CO_2$ laser is used. This problem becomes marked, particularly in a case where the workpiece 70 is thick or when the workpiece is cut at a low speed.

As a result of the present inventors' examination about this problem, the following (A) to (C) are found out.

(A) The progress of the cutting front 72 is synchronized to the progress of the laser beam 71 at high-speed cutting. As a result, melting occurs continuously and smoothly.

(B) If low-speed cutting is performed, the progress of the cutting front 72 cannot be synchronized to the progress of the laser beam 71. That is, melting occurs intermittently on a cutting line. This results in deterioration of cutting surface roughness. If the cutting speed is V and the threshold value of a speed at which the deterioration of the cutting surface roughness does not occur is $V_0$, the deterioration of the cutting surface roughness occurs at $V<V_0$. This $V_0$ can be expressed by the following Formula (6).

$$V_0 = \frac{I_0}{\rho C_p T_m} \quad (6)$$

Here, ρ represents the density of a workpiece, $T_m$ represents the melting point of the workpiece, and $C_p$ represents specific heat. $I_0$ represents the power density of a laser beam at a position where the surface temperature T of the workpiece reaches $T_m$.

Figure 7:
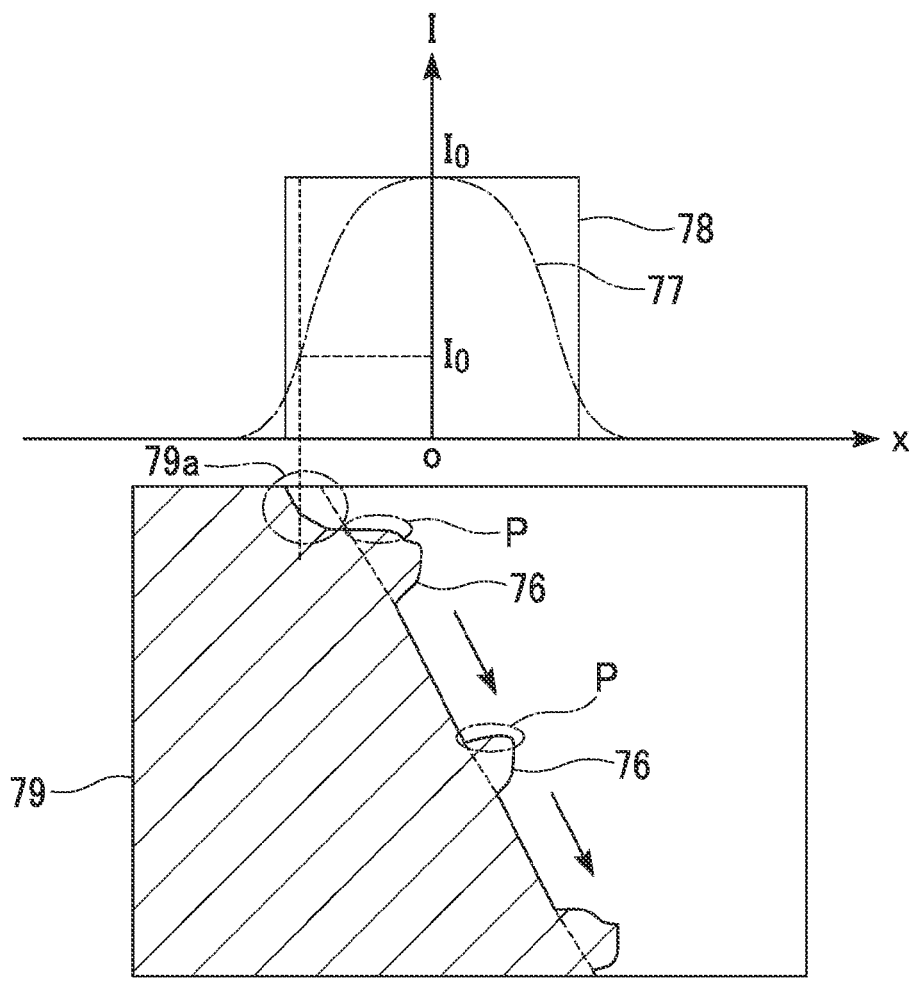
FIG. 7 is a view showing the relationship between a convex portion generated during laser cutting and the power density of a laser beam.

FIG. 7 is a view schematically showing a situation in which deterioration of the cutting surface roughness occurs at $V<V_0$, using the laser apparatus of the related art. As shown in FIG. 7, in a low-speed zone ($V<V_0$), a melting phenomenon becomes discontinuous in the vicinity 79a of the surface of the workpiece 79, and regions P (convex portions 76) where the absorption power density of a laser beam is high appear locally in a curf front. This causes deterioration of the surface roughness.

(C) As a suggestion for improvement of the cutting surface roughness at a low speed, a skirt is added to the power density distribution of a laser beam and a workpiece ahead in a cutting direction is preheated, so that melting of metal can be continuously and smoothly caused. This can be inferred from the above Formula (6). According to the above Formula (6), as the value of $I_0$ is smaller, the threshold $V_0$ becomes smaller. That is, as the value of $I_0$ is smaller, the range of speed where cutting of a workpiece can be performed without deteriorating the cutting surface roughness becomes wide.

The relationship between the position of a laser beam and the position where the surface temperature T of the workpiece 79 reaches $T_m$ is also shown in FIG. 7. The power density distribution 77 (Gaussian shape) of a $CO_2$ laser beam and the power density distribution 78 (top-hat shape) of a fiber laser beam are simultaneously shown for convenience in FIG. 7. As can be understood in FIG. 7, the $CO_2$ laser beam with the Gaussian distribution has a smaller value of $I_0$ than that of the fiber laser beam with the top-hat shaped distribution. Accordingly, in a case where the laser apparatus of the related art is used, $I_0$ described in the above Formula (6) becomes large, and the range of speed where deterioration of the cutting surface roughness occurs becomes wider than that in the case where $CO_2$ laser is used.

When the laser materials processing apparatus 10 of the present embodiment is used as a cutting apparatus and is moved to a cutting location, the semiconductor laser beam 4b having the power density $I_b$ is first irradiated to the workpiece. Therefore, the workpiece ahead of the cutting location can be preheated. In this case, the energy absorption of the fiber laser beam 4b occurs in the preheated location. In the present embodiment, $I_a > I_b$ is established, therefore, this energy absorption did not occur excessively, and the value of $I_0$ can be made smaller than the laser apparatus of the related art similarly to the case where $CO_2$ laser is used. Therefore, cutting of the workpiece is allowed at a wider range speed while suppressing deterioration of the cutting surface roughness.

In this case, by setting the power density $I_b$ of the semiconductor laser beam 4b to an optimal value, a preheating effect of a portion ahead of a cutting line is further enhanced, formation of the convex portions 76 during cutting described above is further suppressed, and a cutting cross-section can be brought into a smoother state.

That is, the power density $I_b$ of the semiconductor laser beam 4b preferably satisfies the following Formula (7). This allows cutting of the workpiece 9 while suppressing deterioration of the cutting surface roughness even in a case where processing speed is low or a case where the workpiece 9 is thick. In a case where $I_b$ satisfies the following Formula (7), and for example, SUS304 is used as the workpiece 9, cutting using the laser beam 4 under the conditions that the thickness of the workpiece 9 is 4 to 12 mm, the cutting speed is 0.5 to 3 m per minute (mpm), and the cutting surface roughness is equal to or less than about 30 μm or less is allowed.

$$I_b \cdot (D2-D1)/2 > 0.2 \cdot (1/A) \cdot \kappa \cdot \{\rho C_p (T_m - T_0) + \rho L_m\} \quad (7)$$

Here, $I_b \cdot (D2-D1)/2$ correspond to the area (the integration value of the power density of one region 42a of the second region 42 outside the first region, in the power density distribution of the semiconductor laser beam 4b) of a shaded portion 42a of FIG. 5. A represents the absorption factor of the semiconductor laser beam 4b to the workpiece 9, κ represents the thermal diffusion coefficient of the workpiece 9, ρ represents the density of the workpiece 9, $C_p$ represents the specific heat of the workpiece 9, $T_m$ represents the melting point of the workpiece 9, $T_0$ represents the initial temperature (room temperature) of the workpiece 9, and $L_m$ represents the latent heat of fusion of the workpiece 9.

Although cutting of the workpiece 9 has been described in the above embodiment, the same can also be applicable regarding a case where grooving processing is performed to the workpiece 9. By using the laser apparatus 1A and the fiber processing apparatus 10 of the embodiment, grooving processing at a wider range speed is allowed, and the roughness of a formed groove is improved.

Additionally, the laser apparatus 1A and the laser materials processing apparatus 10 of the present embodiment can also be applied to welding or cladding. In welding or cladding using the laser apparatus of the related art, there is a case where the amount of spattering matter of a workpiece may increase as compared to the processing using $CO_2$ laser, and this processing cannot be performed with desired quality. This phenomenon becomes marked particularly in a case where the processing speed is slow. This also originates from the fact that, in a case where the laser apparatus of the related art is used similarly to the cutting described above, the value of $I_0$ in becomes larger than that in the case where $CO_2$ laser is used. According to the laser materials processing apparatus 10 including the laser apparatus 1A of the present embodiment, similarly to the above, the value of $I_0$ can be made small. Therefore, welding or cladding that has suppressed the amount of scattered matter of a workpiece at a wide range processing speed is allowed.

Figure 8:
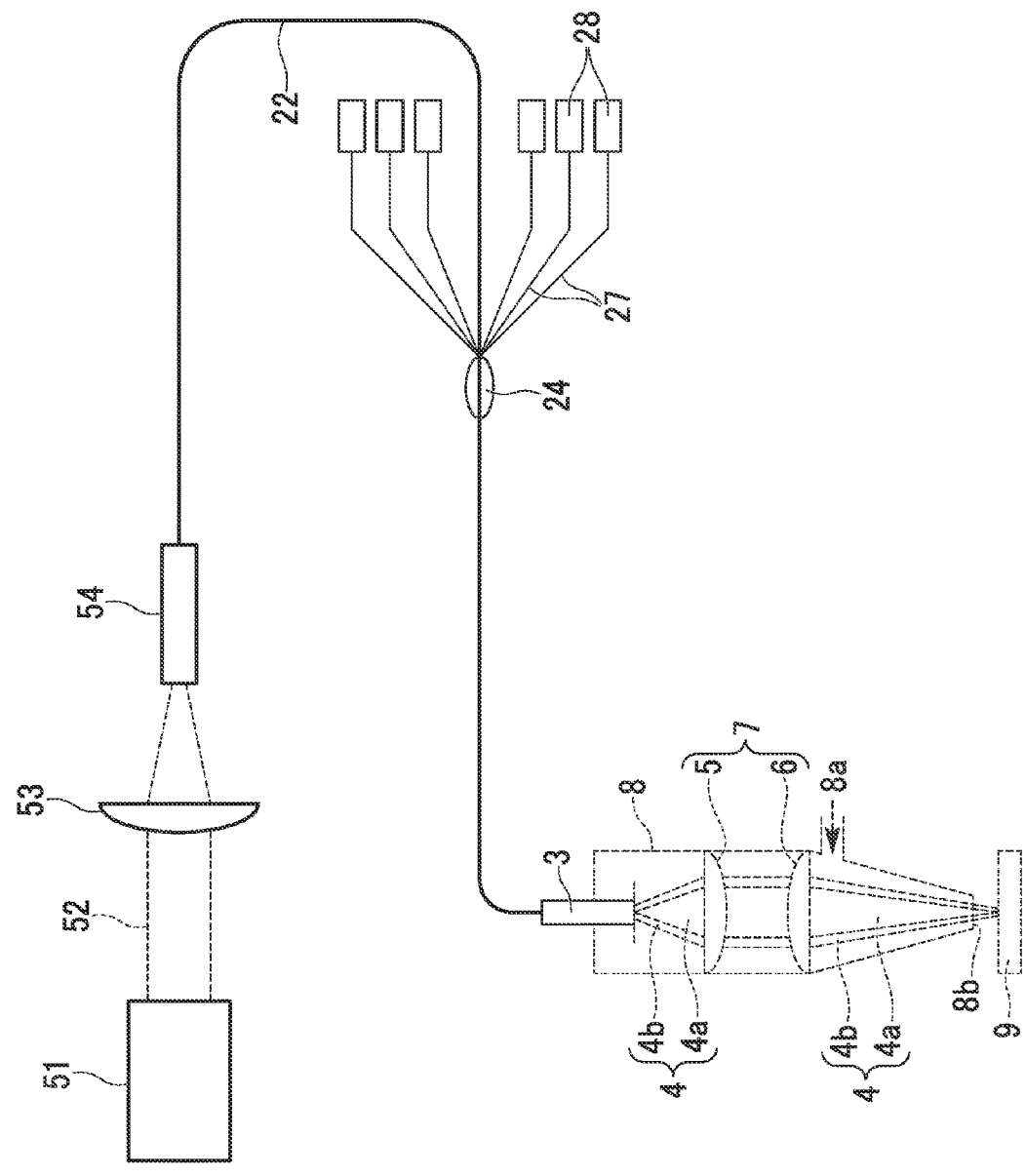
FIG. 8 is a view schematically showing a modified example of the laser materials processing apparatus of the present invention.

Although a case where the fiber laser beam 4a emitted from the active fiber 20 that is a laser resonator is used is shown in the above embodiment, the present invention is not limited only to this system. This laser beam is not particularly limited if the laser beam can propagate through the core 22a of the passive fiber 22. A configuration example is shown in FIG. 8. FIG. 8 schematically shows a modified example of the laser apparatus of the present invention. The laser apparatus 1B(1) is different from the above-described laser apparatus 1A(1) in that the first laser beam 52 emitted from the first laser oscillator 51 is condensed by the lens 53 and is coupled into the passive fiber 22 from the incident end 54.

Figure 9:
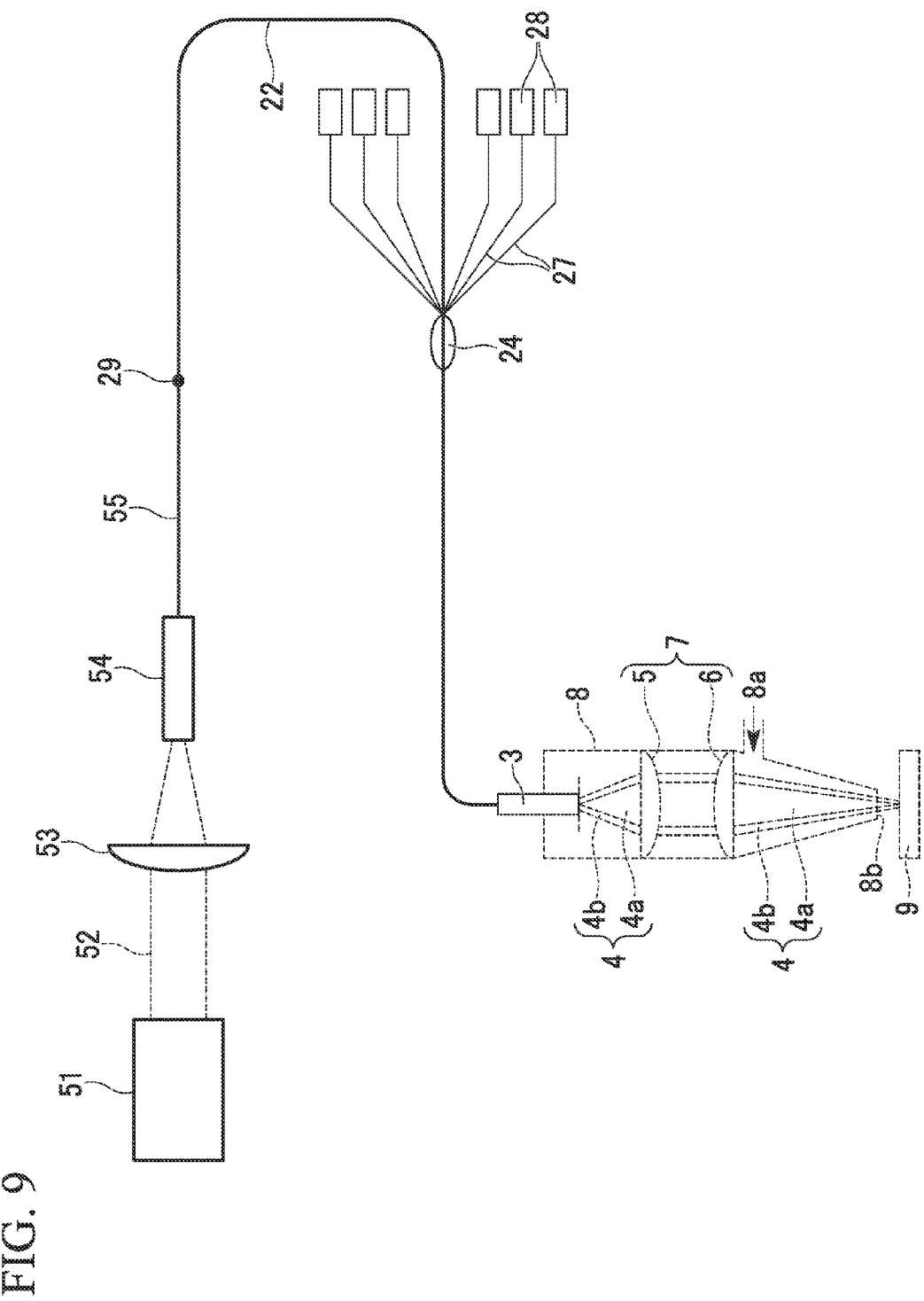
FIG. 9 is a view schematically showing another modified example of the laser materials processing apparatus of the present invention.

As another modified example, there is a laser apparatus 1C(1) shown in FIG. 9. This laser apparatus 1C(1) is different from the above-described laser apparatus 1A(1) in that the first laser beam 52 emitted from the first laser oscillator 51 is condensed by the lens 53 and is coupled into the ordinary optical fiber 55 with single-layer cladding from the incident end 54, and the passive fiber 22 is connected to the downstream side of the optical fiber 55. By virtue of this configuration, the first laser beam incident on the passive fiber 22 propagates through the core 22a of the fiber 22. The semiconductor laser beams emitted from the second semiconductor laser beam sources 28 as second laser oscillators are coupled into the inner cladding 22b of the passive fiber 22 via the optical fiber 27 and the second multi-coupler 24. In this way, the first laser beam and the semiconductor laser beams are coupled to the passive fiber 22 and thereby coaxialized. Here, the same effects as those described above can be obtained by making the power density $I_b$ of semiconductor laser beam smaller than the power density $I_a$ of the first laser beam emitted from the first laser oscillator. As the first laser oscillator, for example, a disk laser can be used.

EXAMPLES

Example 1

As Example 1 of the present invention, the laser apparatus 1A shown in FIG. 2 was assembled, and the laser materials processing apparatus 10 shown in FIG. 1 was assembled using this laser apparatus.

The wavelength of signal light was 1085 nm, and the wavelength of pumping light and a semiconductor laser beam was 976 nm.

As the active fiber, a double cladding fiber in which the core diameter is 0.2 mm, the diameter of the inner cladding is 0.8 mm, and Yb that is doped on the core was used.

As the passive fiber, a double-clad fiber in which the core diameter is 0.2 mm, the diameter of the inner cladding is 0.8 mm, without a rare earth element doping to the core, was used. The relative index difference between the core and the inner cladding was 0.002.

The maximum output obtained from the output end of the laser apparatus 1A was 4 kW in the fiber laser beam with a wavelength of 1085 nm and was 2 kW in the semiconductor laser beam with a wavelength of 976 nm. In the following examples, the output of the fiber laser beam was fixed to 4 kW, and the output of the semiconductor laser beam was appropriately changed.

As for the irradiation optical system 7 of the laser materials processing apparatus 10, a collimating lens in which the focal length is fa=200 mm was used as the collimating lens 5. A condenser lens 6 in which the focal length is fb=200 mm was used. The spot diameter D1 of the fiber laser beam 4a and spot diameter D2 of the semiconductor laser beam 4b at the irradiation point α were D1=0.2 mm and D2=0.8 mm as calculated from the above-described Formulas (4) and (5). Since the output of the fiber laser beam was fixed to 4 kW, $I_a$ was always $1.3 \times 10^{11}$ (W/m$^2$).

Comparative Example

In the comparative example (equivalent to a conventional example), the output of the semiconductor laser beam in Example 1 was set to zero.

SUS304 was cut by the laser materials processing apparatuses of Example 1 and the comparative example, using nitrogen gas as the assist gas. In this case, the thickness of the SUS304 was kept constant at 10 mm, and the cutting speed was kept constant at 1 (mpm). As the cutting surface roughness, the roughness in the direction of a cutting line at a depth of 1 mm from the surface of a material was measured. With respect to Example 1, SUS304 was cut while changing the output (P2) of the semiconductor laser beam, and the cutting surface roughness (Rz) was investigated.

Figure 10:
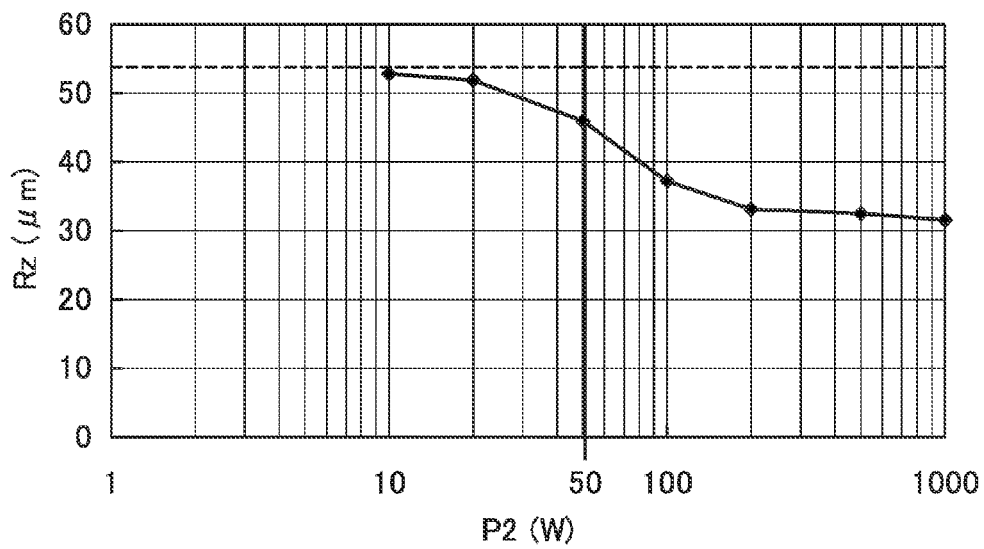
FIG. 10 is a view showing the relationship between the output power of a semiconductor laser and cutting surface roughness in Example 1.

The results are shown in Table 1 and FIG. 10. In addition, P2 is the output (W) of the semiconductor laser beam, $I_b$ is the power density (W/m$^2$) of the semiconductor laser beam, and Rz is the average of measured cutting surface roughness (μm).

TABLE 1

| P2 (W) | I2 (W/m$^2$) | I2 · (D2 − D1)/2 (W/m) | Rz (μm) |
|---|---|---|---|
| 0 | 0.0E+00 | 0.00E+00 | 53.6 |
| 10 | 2.0E+07 | 6.00E+03 | 52.8 |
| 20 | 4.0E+07 | 1.20E+04 | 51.9 |
| 50 | 9.9E+07 | 3.00E+04 | 45.8 |
| 100 | 2.0E+08 | 6.00E+04 | 37.2 |
| 200 | 4.0E+08 | 1.20E+05 | 33 |
| 500 | 9.9E+08 | 3.00E+05 | 32.4 |
| 1000 | 2.0E+09 | 6.00E+05 | 31.6 |

In the comparative example (P2=0), the cutting surface roughness Rz was 53.6 μm. In contrast, in Example 1, the cutting surface roughness Rz decreased as compared to the comparative example. Particularly, as the output (P2) of the semiconductor laser beam was raised, the cutting surface roughness Rz decreased.

If P2 becomes equal to or more than 50 W, that is, the left side $I_b$·(D2−D1)/2 of the above Formula (7) becomes equal to or more than $3.0 \times 10^4$ (W/m), it turns out that a great effect for smoothing of a cutting surface is exhibited. In addition, in a line segment shown in FIG. 10, a part of P2=50 is a position that becomes the point of inflection of the curve if this line segment is supposed to be a curve.

With respect to SUS304, the value of the right side 0.2·(1/A)·κ·{$\rho C_p(T_m-T_0)+\rho L_m$} described in the above Formula (7) is $2.8 \times 10^4$ (W/m). Accordingly, it turns out that the condition that the effect is further exhibiting is a range described in the above Formula (7).

Example 2

The plate thickness of SUS304 was changed and cut in a range of 1 to 12 mm, using the same laser materials processing apparatus as the above-described Example 1 and comparative example.

With respect to respective plate thicknesses, first, a cutting speed that minimizes the cutting surface roughness Rz at P2=0 was obtained (comparative example). As the plate thickness became larger, the cutting speed decreased. Next, P2 was now changed at the obtained cutting speed, and P2 where a minimum cutting surface roughness Rz is obtained was determined (Example 2). In addition, the respective values of P2 in Example 2 satisfy the above Formula (7).

Figure 11:
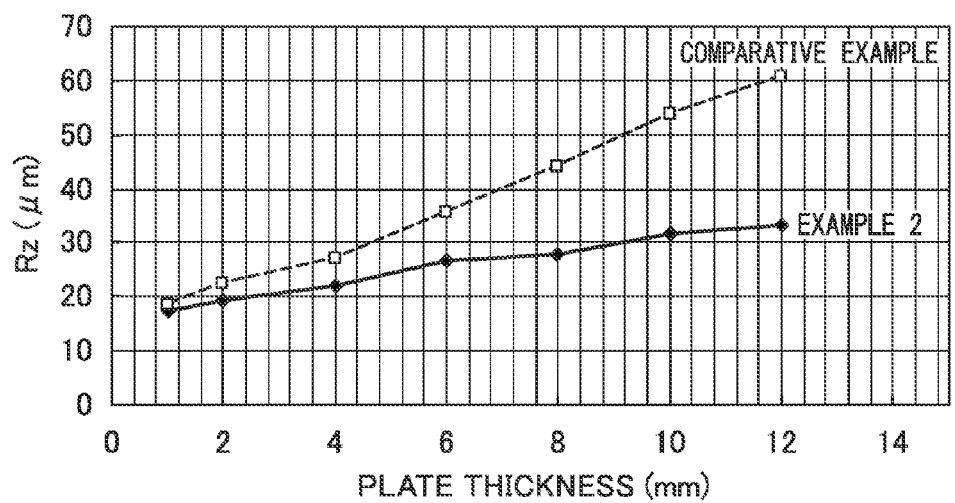
FIG. 11 is a view showing the relationship between cutting plate thickness and cutting surface roughness in Example 2 and a comparative example.

The results are shown in Table 2 and FIG. 11.

TABLE 2

| Example 2 | | | | Comparative Example | | | |
|---|---|---|---|---|---|---|---|
| Plate Thickness (mm) | V (mpm) | P2 (W) | Rz (μm) | Plate Thickness (mm) | V (mpm) | P2 (W) | Rz (μm) |
| 1 | 15 | 1800 | 17.3 | 1 | 15 | 0 | 18.6 |
| 2 | 7 | 1500 | 19.5 | 2 | 7 | 0 | 22.3 |
| 4 | 3 | 1300 | 22.0 | 4 | 3 | 0 | 26.9 |
| 6 | 2 | 1200 | 26.8 | 6 | 2 | 0 | 35.4 |
| 8 | 1.4 | 1100 | 27.8 | 8 | 1.4 | 0 | 44.1 |
| 10 | 1 | 1000 | 31.6 | 10 | 1 | 0 | 53.6 |
| 12 | 0.7 | 800 | 33.4 | 12 | 0.7 | 0 | 60.7 |

In the comparative example (P2=0), the cutting surface roughness Rz deteriorated as the plate thickness became larger, that is, the cutting speed became lower. In contrast, in the laser processing apparatus of Example 2, the value of the cutting surface roughness Rz was small, and deterioration of the cutting surface roughness was suppressed. Particularly, as the plate thickness was larger and the cutting speed was slower, deterioration of the cutting surface roughness Rz was more effectively suppressed.

Example 3

Figure 12:
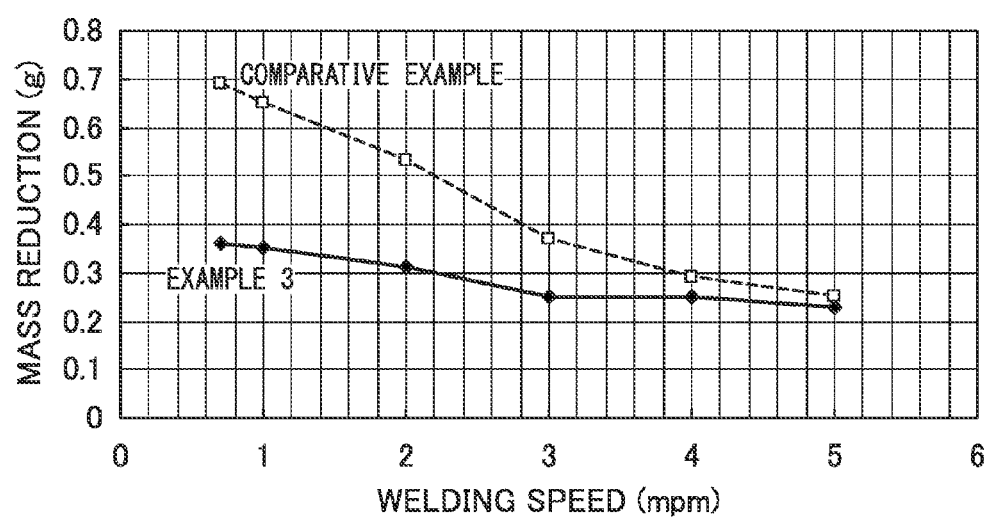
FIG. 12 is a view showing the relationship between welding speed and mass reduction in Example 3 and the comparative example.
Figure 13:
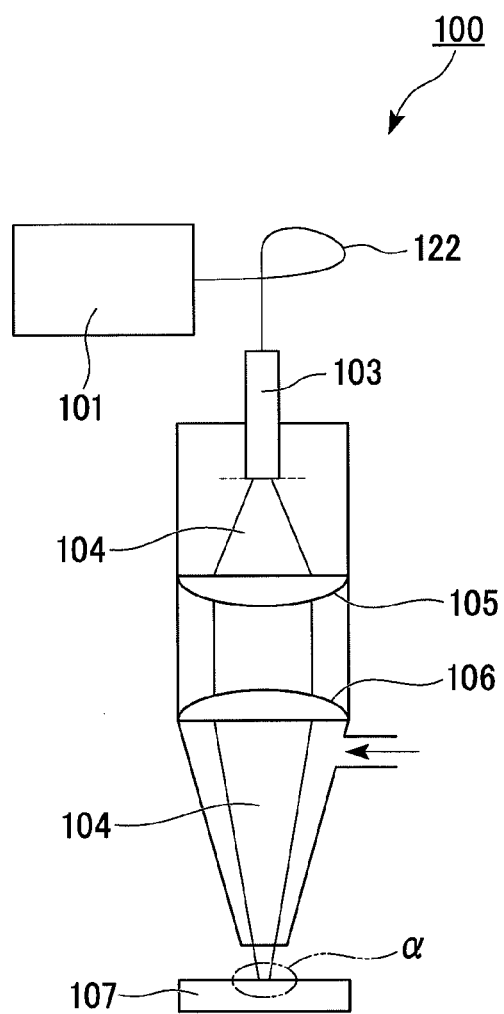
FIG. 13 is a view schematically showing a laser materials processing apparatus of the related art.
Figure 14:
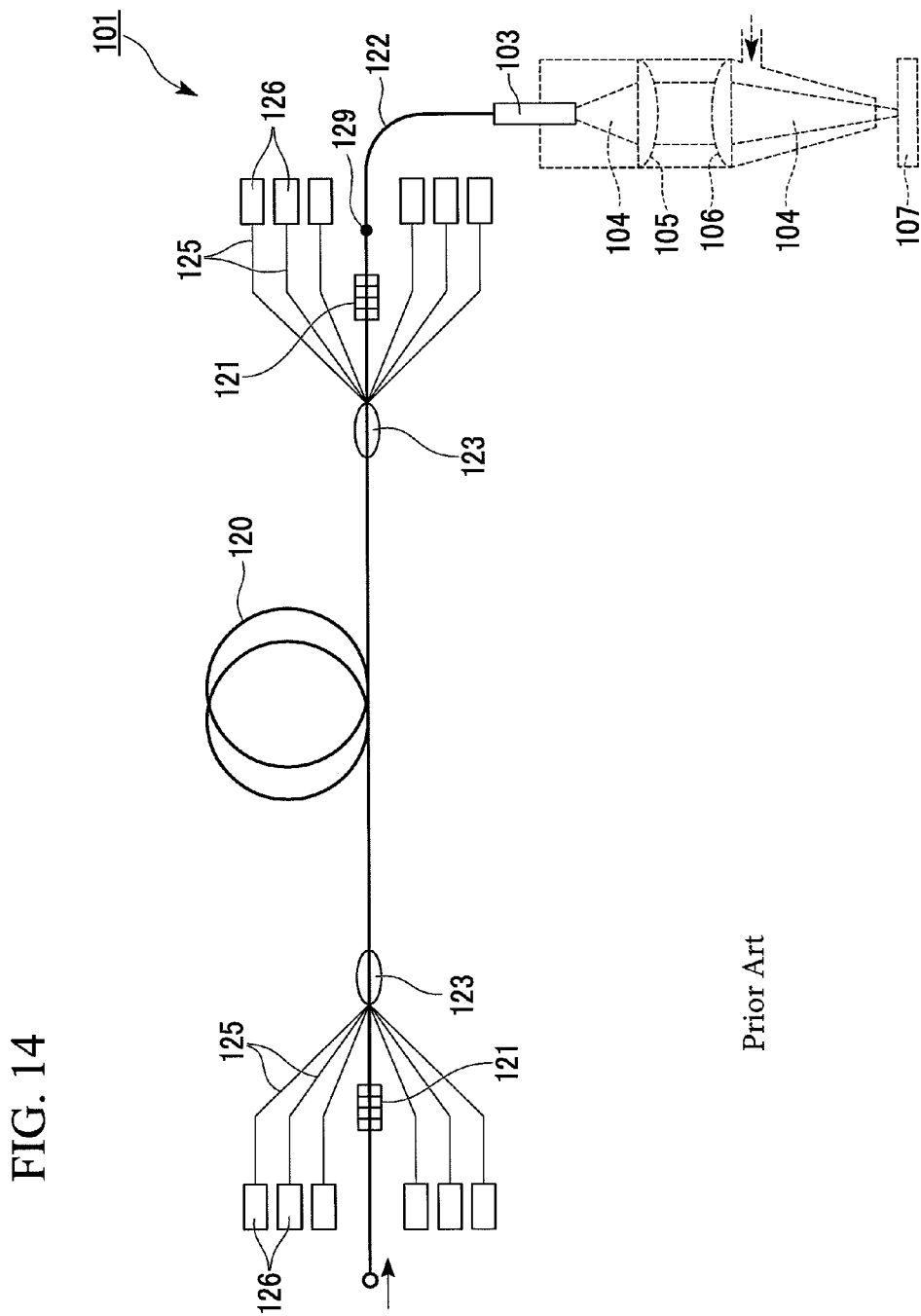
FIG. 14 is a view schematically showing a laser apparatus used for the laser materials processing apparatus of the related art.
Figure 15:
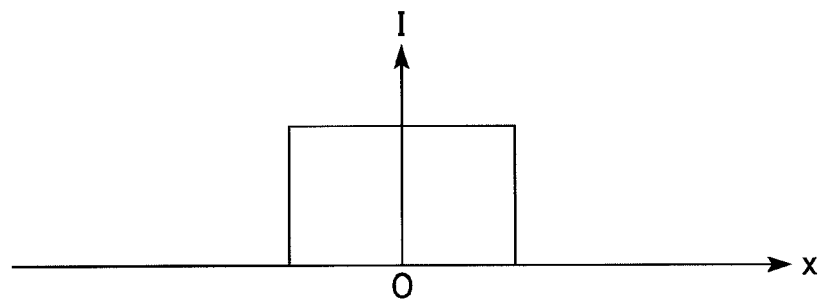
FIG. 15 is a view showing the space distribution of the power density of a laser beam at an irradiation point α in a case where the laser materials processing apparatus of the related art is used.

Overlapping welding of 2 mm-thick steel sheets was performed using the same laser materials processing apparatus 10 as the above-described Example 1 and comparative example. In this case, the overlapping welding was performed while changing the welding speed as shown in Table 3. The welding length is 100 mm. The mass of the steel before and after welding was measured and the amount of reduction in the mass was evaluated. The results are shown in Table 3 and FIG. 12. In Example 3, the value of P2 when the amount of reduction in the mass becomes the minimum is obtained. Then, the value of P2 and the value of reduction in the mass are recorded. In addition, the respective values of P2 in Example 3 satisfy the above Formula (7).

TABLE 3

| Example 3 | | | Comparative Example | | |
|---|---|---|---|---|---|
| V (mpm) | P2 (W) | Mass Reduction (g) | V (mpm) | P2 (W) | Mass Reduction (g) |
| 0.7 | 800 | 0.36 | 0.7 | 0 | 0.69 |
| 1 | 1000 | 0.35 | 1 | 0 | 0.65 |
| 2 | 1200 | 0.31 | 2 | 0 | 0.53 |
| 3 | 1300 | 0.25 | 3 | 0 | 0.37 |
| 4 | 1350 | 0.25 | 4 | 0 | 0.29 |
| 5 | 1400 | 0.23 | 5 | 0 | 0.25 |

In the comparative example, as the welding speed was slow, the amount of reduction in the mass increased. In contrast, in Example 3, reduction in the mass at every welding speed was suppressed more than that of the comparative example. That is, reduction in the amount of spattering matter generated during welding of the workpiece (steel) was observed. Accordingly, the method of Example 3 also has an effect of suppressing adhesion of the spatters of welding or suppressing depressions of beads.

INDUSTRIAL APPLICABILITY

As the introduction of the laser apparatus and laser materials processing apparatus of the present invention progresses, industrially effects that are very useful are exhibited such that productivity rises as compared to the processing apparatus of $CO_2$ laser and running costs drops.

REFERENCE SIGNS LIST 1 (1A, 1B, 1C): LASER APPARATUS
3: OUTPUT END
4: LASER BEAM
4a: FIBER LASER BEAM (FIRST LASER BEAM)
4b: SEMICONDUCTOR LASER BEAM (SECOND LASER BEAM)
5: COLLIMATING LENS
6: CONDENSER LENS
7: IRRADIATION OPTICAL SYSTEM
8: HOUSING
8a: GAS INLET
8b: TIP OPENING
9: WORKPIECE
10: LASER MATERIALS PROCESSING APPARATUS
20: ACTIVE FIBER
20a: CORE
20b: INNER CLADDING
20c: OUTER CLADDING
21 (21a, 21b): FIBER BRAGG GRATING (FBG)
22: PASSIVE FIBER
22a: CORE
22b: INNER CLADDING
22c: OUTER CLADDING
23 (23a, 23b): FIRST MULTI-COUPLER
24: SECOND MULTI-COUPLER
25 (25a, 25B): FIRST OPTICAL FIBER
26 (26a, 26b): PUMPING LIGHT SOURCE (FIRST SEMICONDUCTOR LASER BEAM SOURCE)
27: SECOND OPTICAL FIBER
28: SECOND SEMICONDUCTOR LASER BEAM SOURCE
29: CONNECTING POINT
41: FIRST REGION
42: SECOND REGION
51: FIRST LASER OSCILLATOR
52: FIRST LASER BEAM
53: CONDENSER LENS
54: INCIDENT END
55: OPTICAL FIBER
71: LASER BEAM
72: CUTTING FRONT
73: MELTING LAYER
74: ASSIST GAS FLOW
75: LASER BEAM TRAVELING DIRECTION
76: CONVEX PORTION
77: POWER DENSITY DISTRIBUTION OF $CO_2$ LASER BEAM
78: POWER DENSITY DISTRIBUTION OF FIBER LASER BEAM
79: WORKPIECE
α: IRRADIATION POINT
100: LASER MATERIALS PROCESSING APPARATUS
101: LASER APPARATUS
103: EMITTING END
104: LASER BEAM
105: COLLIMATING LENS
106: CONDENSER LENS
107: WORKPIECE
120: ACTIVE FIBER
121: FIBER BRAGG GRATING (FBG)
122: OPTICAL FIBER
123: MULTI-COUPLER
125: OPTICAL FIBER
126: SEMICONDUCTOR LASER BEAM SOURCE
129: CONNECTING POINT

The invention claimed is:

1. A laser apparatus comprising:
an active fiber having a core, a first end and second end;
a passive fiber connected to the second end of the active fiber, the passive fiber having a core and an inner cladding surrounding the core;
a first laser light source that emits a first laser beam into the core of the active fiber; and
a second laser light source that emits a second laser beam that is coupled into the inner cladding of the passive fiber,
wherein the second laser light source is located at a downstream side of the first laser light source,
wherein a refractive index of the core of the passive fiber is larger than a refractive index of the inner cladding of the passive fiber, and
wherein a power density distribution of each of the first laser beam and the second laser beam which are emitted from an output end of the passive fiber is a multi-mode.

2. The laser apparatus according to claim 1, wherein an incident angle $\theta_{FL}$ of the first laser beam that is coupled into a core of the passive fiber is smaller than an incident angle $\theta_{LD}$ of the second laser beam that is coupled into the inner cladding of the passive fiber.

3. The laser apparatus according to claim 2, wherein a wavelength $\lambda 1$ of the first laser beam and a wavelength $\lambda 2$ of the second laser beam satisfy $0.6 \leq \lambda 2/\lambda 1 < 0.97$.

4. The laser apparatus according to claim 1, wherein a wavelength $\lambda 1$ of the first laser beam and a wavelength $\lambda 2$ of the second laser beam satisfy $0.6 \leq 2/\lambda 1 \leq 0.97$.

5. A laser materials processing apparatus that condenses a laser beam and irradiates a workpiece with the laser beam, comprising:
the laser apparatus according to any one of the preceding claims; and
an irradiation optical system having a collimating lens and a condenser lens.

6. The laser materials processing apparatus according to claim 5, wherein a power density $I_b$ of the second laser beam is smaller than a power density $I_a$ of the first laser beam.

7. The laser materials processing apparatus according to claim 6,
wherein the power density $I_b$ of the second laser beam satisfies the following Formula (1):

$$I_b \cdot (D2-D1)/2 > 0.2 \cdot (1/A) \cdot \kappa \cdot \{\rho C_p(T_m-T_0)+\mu L_m\} \quad (1)$$

Here,
D1: Spot diameter of the first laser beam,
D2: Spot diameter of the second laser beam,
A: Absorption factor of the second laser beam to the workpiece,
κ: Thermal diffusion coefficient of the workpiece,
ρ: Density of the workpiece,
$C_p$: Specific heat of the workpiece,
$T_m$: Melting point of the workpiece,
$T_0$: Initial temperature of the workpiece (room temperature), and
$L_m$: Latent heat of fusion of the workpiece.

8. The laser materials processing apparatus according to claim 5, wherein the power density $I_b$ of the second laser beam satisfies the following Formula (1):

$$I_b \cdot (D2-D1)/2 > 0.2 \cdot (1/A) \cdot \kappa \cdot \{\rho C_p(T_m-T_0)+\mu L_m\} \quad (1)$$

Here,
D1: Spot diameter of the first laser beam,
D2: Spot diameter of the second laser beam, A: Absorption factor of the second laser beam to the workpiece,
κ: Thermal diffusion coefficient of the workpiece,
ρ: Density of the workpiece,
$C_p$: Specific heat of the workpiece,
$T_m$: Melting point of the workpiece,
$T_0$: Initial temperature of the workpiece (room temperature), and
$L_m$: Latent heat of fusion of the workpiece.

9. The laser apparatus according to claim 1, further comprising a multi coupler connecting the second laser light source to the passive fiber.

10. The laser apparatus according to claim 1, wherein a diameter of the core of the passive fiber is equal to or larger than a diameter of the core of the active fiber.

* * * * *